United States Patent [19]

Schmitz et al.

[11] Patent Number: 5,360,658
[45] Date of Patent: Nov. 1, 1994

[54] ANTISTATIC EXTRUDED POLYCARBONATE SHEETS

[75] Inventors: Jürgen Schmitz, Dormagen; Hans-Leo Weber, Rommerskirchen; Hans-Josef Fausten, Dormagen; Hans-Wolfgang Schmoranzer, Willich; Udo Hänsel, Dormagen, all of Germany

[73] Assignee: Bayer Aktiengesellschaft, Leverkusen, Germany

[21] Appl. No.: 29,810

[22] Filed: Mar. 11, 1993

[30] Foreign Application Priority Data

Mar. 18, 1992 [DE] Germany .............. 4208644

[51] Int. Cl.$^5$ .............. B32B 27/36
[52] U.S. Cl. .............. 428/215; 428/412; 428/408; 428/483; 428/922
[58] Field of Search .............. 428/412, 215, 408, 483, 428/922

[56] References Cited

U.S. PATENT DOCUMENTS

| | | | |
|---|---|---|---|
| 3,218,327 | 11/1966 | Elslager et al. | 260/293 |
| 4,515,925 | 5/1985 | Kleiner et al. | 525/439 |
| 4,559,164 | 12/1986 | Kostelnik et al. | 252/511 |
| 4,599,262 | 7/1986 | Schulte et al. | 428/215 |
| 4,791,016 | 12/1988 | Schulte et al. | 428/220 |
| 4,876,034 | 10/1989 | Dziurla et al. | 252/511 |

FOREIGN PATENT DOCUMENTS

| | | |
|---|---|---|
| 1238164 | 6/1988 | Canada . |
| 4854160 | 7/1973 | Japan . |
| 2196854 | 8/1990 | Japan . |
| 2233765 | 9/1990 | Japan . |

*Primary Examiner*—P. C. Sluby
*Attorney, Agent, or Firm*—Joseph C. Gil; Aron Preis

[57] ABSTRACT

The present invention relates to antistatic extruded polycarbonate sheets produced from thermoplastic polycarbonates, polyalkylene terephthalates and carbon black, as well as processes for the production of such sheets.

2 Claims, No Drawings

ANTISTATIC EXTRUDED POLYCARBONATE SHEETS

The present invention relates to carbon-containing sheets produced by the extrusion process which have a thickness of 0.15 mm to 0.6 mm, a surface resistivity of $\leq 5 \times 10^5$ ohms and an elongation at break of $>20\%$ and which are characterised in that they contain
   a) 53% by weight to 71% by weight of thermoplastic polycarbonates,
   b) 29% by weight to 16% by weight of thermoplastic polyalkylene terephthalates and
   c) 18% by weight to 13% by weight, of carbon black, the sum of the percentages by weight of components a)+b)+c) being in each case 100% by weight.

The sheets are characterised by antistatic properties ranging to a certain degree of conductivity, as well as high toughness, tear resistance and heat resistance. The sheets according to the invention are thus for example suitable for packaging electronic components, and in particular those susceptible to electrostatic charging.

The present invention thus also relates to the use of the carbon-containing sheets according to the invention for packaging electronic components.

The present invention also relates to a process for the production of carbon-containing sheets which is characterised in that the thermoplastic polycarbonate is intimately mixed with the carbon black and, after adding the thermoplastic polyalkylene terephthalate, the whole mixture is extruded to produce the required sheets.

The invention also relates to carbon-containing sheets obtainable by the process according to the invention.

JP 932,197 (JA-A 46 88 686) discloses mixtures of 50 parts or more of polycarbonate and 50 pans or less of polybutylene terephthalate. The addition of the polybutylene terephthalate serves to facilitate the processing of the polycarbonate resin.

Carbon black can be added as one of the fillers. The production of sheets is not mentioned in the Japanese literature reference.

U.S. Pat. No. 4,559,164. discloses electrically conductive polybutylene terephthalates which can contain 10 to 25% by weight of carbon black (column 1, lines 65/67 of the US patent). In addition, claim 1 of the U.S. patent states that the blends can contain 1 to 50% of bisphenol-A polycarbonate; thus the quantity of polybutylene terephthalate is at least 37.5%, with 12.5% carbon black and 50% polycarbonate. Where smaller contents of carbon black and smaller contents of polycarbonate are present the quantity of polybutylene terephthalate is even higher.

According to claim 4 of the U.S. patent the quantity of bisphenol-A polycarbonate represents 1 to 50% by weight of the polybutylene terephthalate in the blend. However this is intended to be understood, namely 50% of a 75/25 PBT/carbon black mixture, i.e. 37.5 PBT/37.5 PC/25 carbon black or 50 PBT/25 PC/25 carbon black or 75 PBT/25 carbon black/37.5 PC, the polybutylene terephthalate content is by no means smaller than the polycarbonate content.

U.S. Pat. No. 4,559,164 does not mention sheets.

EP 0,249, 101, or U.S. Pat. No. 4,876,033, discloses sheets of polycarbonate/polyalkylene terephthalate blends which do however contain mixtures of carbon black and graphite.

Such sheets also have a poor elongation at break.

JP 2-233765 describes polycarbonate/polyalkylene terephthalate/carbon black mixtures for electrophotographic shaped articles, which have an elongation at break of only 0 to 20%.

JP 2-196854 discloses polycarbonate/polyalkylene terephthalate/carbon black mixtures for electrically conductive sheets which also have a low elongation at break.

U.S. Pat. No. 3218327 generally describes mixtures of polycarbonates with polyalkylene terephthalates. The addition of carbon black is only mentioned (column 3, line 7), as well as the possibility of producing films from the mixtures (column 4, line 9).

The present invention was based on the problem of producing extruded polycarbonate sheets having the following properties:
   1. thickness: 0.15 to 0.6 mm
   2. surface resistivity: $5 \times 10^5$ ohms
   3. elongation at break: $\geq 20\%$
   4. a minimum content of carbon black,
   5. ease of thermoformability,
   6. maximum possible speeds in the production of blister belts for packaging electrostatically sensitive electronic components.

The sheets according to the invention are obtained by producing a polycarbonate compound with a carbon black content of 18% and shaping this compound into a sheet with the aid of an extruder and a flat sheet die. A reduction in the carbon black content to 14% produces an increase in the surface resistivity to $>10^6$ ohms, which means that the above condition ($\leq 5 \times 10^5$ ohms) is no longer fulfilled.

It was surprising and not predictable that surface resistivities of $<5 \times 1$ OS ohms are obtained on adding poly(butylene terephthalate), despite the low carbon black content of 14%, and this result is even obtained with lower carbon black contents, although the requirement of "an elongation at break of $\geq 20\%$" necessitates a minimum polycarbonate content of about 61% and thus a minimum carbon black content of about 13%.

TABLE

| Composition | Measurements using sheets 0.200 mm in thickness | | | |
| --- | --- | --- | --- | --- |
|  | (1) | (2) | (3) | (4) |
| PC % | 82.0 | 85.6 | 65.6 | 61.5 |
| PBT % | — | — | 20.0 | 25 |
| Carbon black % | 18.0 | 14.4 | 14.4 | 13.5 |
| $R_{OA}$ ohm | $2.3 \times 10^4$ | $1.2 \times 10^6$ | $2.7 \times 10^4$ | $4.2 \times 10^4$ |
| $\epsilon_r$ % | 27 | 78 | 42 | 20 |

In addition to the elongation at break and surface resistivity requirements, sheets (3) and (4) produced by the process according to the invention also fulfill the requirement of ease of formability. For SOT 223 casings, for example, the production speed of 100 % for (1) was increased by 42% using (3) and 65% using (4).

Suitable thermoplastic polycarbonates according to the present invention are polycondensates obtainable by reacting diphenols, in particular dihydroxydiaryl alkanes, with phosgene or diesters of carbonic acid, suitable dihydroxydiaryl alkanes in addition to the unsubstituted compounds also being those in which the aryl radicals contain methyl groups or halogen atoms in the o- and/or m-position to the hydroxyl group. Branched polycarbonates are also suitable.

The thermoplastic polycarbonates in question have average weight average molecular weights $\overline{M}_w$ of between 22,000 and 50,000, and preferably between 28,000 and 40,000, determined by measurements of relative viscosity in $CH_2Cl_2$ at 25° C. and a concentration of 0.5 g per 100 ml.

Suitable diphenols are, for example, hydroquinone, resorcinol, 4,4'-dihydroxydiphenyl and bis-(hydroxyphenyl)-alkanes, such as for example $C_1$–$C_8$-alkylene or $C_2$–$C_8$-alkylidene bisphenols, bis-(hydroxyphenyl)-cycloalkanes such as for example $C_5$–$C_{15}$-cycloalkylene or $C_5$–$C_{15}$-cycloalkylidene bisphenols, and bis(hydroxyphenyl)-sulphides, -ethers, as $\alpha,\alpha'$-bis-(hydroxyphenyl)-diisopropylbenzene and the corresponding ring-alkylated or ring-halogenated compounds. Preferred polycarbonates are those based on 2,2-bis-(4-hydroxyphenyl)-propane (bisphenol-A), 2,2-bis-(4-hydroxy-3,5-dichlorophenyl)-propane (tetrachlorobisphenol-A), 2,2-bis-(4-hydroxy-3,5-dimethylphenyl)-propane (tetramethylbisphenol-A), 2,2-bis-(4-hydroxy-3,5-dimethylphenyl)-propane (tetramethylbisphenol-A), 1,1-bis-(4-hydroxyphenyl)-cyclohexane (bisphenol Z) and those based on trinuclear bisphenols such as $\alpha,\alpha'$-( 4-hydroxyphenyl)-p-diisopropylbenzene.

Other diphenols suitable for the production of the polycarbonates are described in U.S. Pat. Nos. 2,970,131, 2,991,273, 2,999,835, 2,999,846, 3,028,365, 3,062,781, 3,148,172, 3,271,367 and 3,275,601.

The aromatic polycarbonates can be branched in known manner by the incorporation of small quantifies, preferably quantities of between 0.05 and 2.0 mol % (based on the diphenols used), of tri- or higher than tri-functional compounds, and in particular those containing three or more than three phenolic hydroxyl groups.

Polycarbonates of this type are described for example in German Offenlegungsschrifis 1,570,533 and 1,595,762, British Patent 1,079,821, U.S. Pat. Re 27,682 and German Patent 2,500,092.

Examples of suitable compounds containing three or more than three phenolic hydroxyl groups are 2,4-bis-(hydroxyphenyl-isopropyl)-phenol, 2,6-bis-(2'-hydroxy-5'-methylbenzyl)-4-methylphenol), 2-(4-hydroxyphenyl)-2-(2,4-dihydroxyphenyl)-propane and 1,4bis-(4,4''-dihydroxytriphenylmethyl)-benzene.

Examples of other trifunctional compounds are 2,4-dihydroxybenzoic acid, trimesic acid, cyanuric chloride and 3,3-bis-(4-hydroxy-3-methylphenyl)-2-oxo-2,3-dihydroindole (isatin-bis-cresol).

Thermoplastic polyalkylene terephthalates according to the invention are polyesters of terephthalic acid and an aliphatic diol, preferably from the group comprising 1,4-butanediol, ethanediol, cyclohexane-1,4-dimethanol, and most preferably 1,4-butanediol.

In addition to the abovementioned glycol radicals the polyalkene terephthalates in question can preferably contain up to 20 mol % of radicals of other aliphatic diols containing 3 to 12 C atoms or cycloaliphatic diols containing 6 to 21 C atoms, e.g. those based on 1,3-propanediol, neopentylglycol, 1,5-pentanediol, 1,6-hexanediol, 3-methylpentane-2,4-diol, 2-methylpentane-2,4-diol and 2,2,4-trimethylpentane-1,3-diol.

In addition to terephthalic acid esters the polyalkylene terephthalates can also contain up to 15 mol % of other dicarboxylic acid radicals, such as for example, isophthalic acid, adipic acid, succinic acid, sebacic acid, naphthalene-2,6-dicarboxylic acid, diphenylcarboxylic acid, azelaic acid and cyclohexanediacetic acid. The polyalkylene glycol terephthalates can be obtained by known processes, for example by transesterification of terephthalic acid dialkyl ester and the corresponding diol (see, for example, U.S. Pat. Nos. 2,647,885, 2,643,989, 2,534,028, 2,578,660, 2,742,494 and 2,901,466). The starting components for the production are for example a lower alkyl ester, preferably the dimethyl ester, of terephthalic acid, which is transesterified with an excess of diol in the presence of suitable catalysts to form the bishydroxyalkyl ester of terephthalic acid. The starting temperature of 140° C. is increased to 210°–220° C. The alcohol liberated is distilled off. The condensation is then carried out at temperatures from 210°–180° C., the pressure being reduced gradually to less than 1 mm Hg and the excess diol being distilled off.

The molecular weights $\overline{M}_w$ of the polyalkylene terephthalates are between 30,000 and 80,000, the molecular weights $\overline{M}_w$ of the copolyesters of terephthalic and isophthalic acids are also between 30,000 and 80,000. The $\overline{M}_w$ is determined by measuring the intrinsic viscosity (the limiting viscosity number, i.e. the reduced specific viscosity value extrapolated to a concentration of 0)—the IV—in phenol/o-dichlorobenzene (1/1) in the form of a 5% solution at 25° C., or with the aid of the RSV value (reduced specific viscosity), ie. the specific viscosity value divided by the concentration of the measured solution. The RSV value is determined in phenol/tetrachloroethane (60/40) at 20° C. using a 23% solution. The IV values are generally between 0.85 and 1.25.

Particularly preferred polyalkylene terephthalates are polybutylene terephthalates having $\overline{M}_w$ between 30,000 and 60,000.

Preferred carbon blacks are so-called conductivity carbon blacks which, in addition to a very small primary particle size, have a large external and internal surface area, i.e. high porosity and thus high BET surface areas measured by $N_2$ adsorption and high dibutyl phthalate (DBP) adsorption values, and they are also highly structured, i.e. have marked agglomerations or aggregations of individual carbon black particles to form larger structures such as, for example, chains, the BET surface areas of the carbon blacks generally being higher than 20 $m^2/g$ and the DBP adsorption values generally being higher than 40 ml/100 g of carbon black.

Particularly suitable conductivity carbon blacks are those with BET surface areas of higher than 50 $m^2/g$ and DBP absorption values of higher than 80 m/100 g and average primary particle sizes of below 50 nanometres (nm). Such electrically conductive carbon blacks are available as commercial special grade carbon blacks with characteristic structures and high electrical conductivities.

The carbon black can be mixed with the thermoplastic polycarbonate for example by powder-mixing techniques, in which the polycarbonate powder is intimately mixed with carbon black at room temperature and the mixture is then extruded into granules in an extruder at about 250° C. to about 300° C. Alternatively, the polycarbonate can be mixed with the carbon black by means of suitable kneading apparatus and metered introduction of the mixing components, after which the mixture can be granulated directly, while adhering to temperatures of about 250° C. to 300° C., although granulation does however have to be carried out with the application of a vacuum, which is obtained by means of degassing devices.

The extrusion of the polycarbonate/carbon black mixtures, which, as described above, are obtained in the form of granulates, with the thermoplastic polyalkylene terephthalate is generally carried out in conventional degassing extruders for the production of extruded sheets. The temperature range of the extrusion process is between about 220° C. and 280° C.

Alternatively, after mixing the polycarbonate with the carbon black, the separate processing into granules can be omitted, and, instead, polyalkylene terephthalate can be immediately added, followed by the abovementioned extrusion. This method of procedure is less advantageous with regard to the handling of the components.

A further method of production consists in adding the polyalkylene terephthalate immediately after mixing the polycarbonate with the carbon black or incorporating it simultaneously and processing the mixture into granules, either, as described above, by extrusion, or by agglomeration in known agglomerating apparatus, before carrying out the extrusion to produce shaped articles, such as for example sheets, as described above. Thermoplastic processing of the polyalkylene terephthalate is thus carried out twice in this process variant.

Mixtures of thermoplastic polycarbonates and thermoplastic polyalkylene terephthalates and sheets produced therefrom are known [see for example EP-OS 0,120,394 (Le A 22 232-EP), EP-OS 0 143 352 (Le A 22 591-EP) and EP-OS 0,106,225 (Le A 21 855-EP) and the literature mentioned in and in relation to these European Offenlegungsschrifts].

Polycarbonate sheets with a content of carbon black are also known [see for example EP-OS 0 143 352 (Le A 22 591) and EP-OS 0 141 310 (Le A 22 590) and the literature mentioned in and in relation to these European Offenlegungsschrifts].

The stabilisers against heat, moisture and air which are customary for thermoplastic polycarbonates and thermoplastic polyalkylene terephthalates can also be added to the thermoplastic polycarbonates and the thermoplastic polyalkylene terephthalates.

The present invention thus also relates to carbon-containing sheets produced by the extrusion process which have a thickness of 0.15 mm to 0.6 mm, a surface resistivity of $\leq 5 \times 10^5$ ohms and an elongation at break of $>20\%$, and which are characterised in that they comprise a) 53% by weight to 71% by weight of thermoplastic polycarbonates,
b) 29% by weight to 16% by weight of thermoplastic polyalkylene terephthalates and
c) 18% by weight to 13% by weight of carbon black and optionally, stabilisers against heat, moisture and air.

EXAMPLES

A

Method of preparing the basic compounds

The basic compound is prepared from a bisphenol-A polycarbonate granulate of $\eta_{rel}$ 1,300, which is stabilised with 0.07% by weight of tris-(3-ethyl-oxetanyl-3)-methyl-phosphite, and carbon black (suitable carbon blacks are those which, in addition to a very small primary particle size, have a large external and internal surface area, i.e. high porosity and thus high BET surface areas measured by $N_2$ adsorption and high dibutyl phthalate (DBP) adsorption values and are also highly structured, i.e. display marked agglomerations or agglomerations of individual carbon black particles to form larger structures, such as for example chains, the BET surface areas of the carbon blacks generally being higher than 20 $m^2/g$ and the DBP adsorption values being higher than 40 ml/100 g of carbon black) in a degassing compounding extruder with metered introduction of the polycarbonate and carbon black components.

The temperature in the melting region of the compounding extruder is 280° C.

B

The production of antistatic sheets

B.1

The basic compound is melted in an extruder in known manner and extruded to form a flat sheet using a flat sheet die and a downstream smoothing apparatus. The extrusion temperature should be 260° to 330° C. and the temperature of the smoothing apparatus should be no higher than 110° C. [For the respective data see composition (1) of the table].

B.2.

The basic compound is intimately mixed with poly(-butylene terephthalate) in a ratio of 80:20 and extruded into a sheet as described in B.1. The extrusion temperature is about 240° to 260° C. and the temperature of the downstream smoothing apparatus is about 60° C. The sheet thus produced has the following composition:

| PC | 65.6% by weight |
|---|---|
| PBT | 20.0% by weight |
| Carbon black | 14.4% by weight |

[For the respective data see composition (3) of the table]

B.3.

The basic compound is intimately mixed with poly(-butylene terephthalate) in a ratio of 75:25 and extruded to form a sheet as described in B.2. The sheet thus obtained has the following composition:

| PC | 61.5% by weight |
|---|---|
| PBT | 25.0% by weight |
| Carbon black | 13.5% by weight |

[For the respective data see composition (4) of the table]

B.4

The basic compound is intimately mixed, in a ratio of 80:20, with polycarbonate of vital $\eta_{rel}=1,300$, which is stabilised with 0.07% by weight of tris-(3-ethyl-oxetanyl-3)-methyl-phosphite, and the mixture is extruded to form a sheet as described in B.1. The sheet thus obtained has the following composition:

| PC | 85.6% by weight |
|---|---|
| Carbon black | 14.4% by weight |

[For the respective data see composition (2) of the table]

We claim:
1. An extruded sheet having a thickness of 0.15 to 0.6 mm., surface resistivity equal to or less than $5 \times 10^5$ ohms and an elongation at break equal to or greater than 20%, consisting of:
- (a) 53 to 71 percent of thermoplastic polycarbonate,
- (b) 29 to 16 percent of thermoplastic polyalkylene terephthalate, and
- (c) 18 to 13 percent of carbon black, said percents being based on weight, the sum of the percents of said (a)+(b)+(c) being 100% by weight.

2. Sheets according to claim 1, characterized in that they consist of components a)+b)+c) and optionally stabilisers against heat, moisture and air.

* * * * *